(12) United States Patent
Straeter

(10) Patent No.: US 10,159,187 B2
(45) Date of Patent: Dec. 25, 2018

(54) CHOPPER ASSEMBLY

(71) Applicant: James E. Straeter, Rochester, IN (US)

(72) Inventor: James E. Straeter, Rochester, IN (US)

(*) Notice: Subject to any disclaimer, the term of this patent is extended or adjusted under 35 U.S.C. 154(b) by 50 days.

(21) Appl. No.: 15/477,823

(22) Filed: Apr. 3, 2017

(65) Prior Publication Data

US 2017/0280624 A1 Oct. 5, 2017

Related U.S. Application Data

(60) Provisional application No. 62/317,714, filed on Apr. 4, 2016.

(51) Int. Cl.
| | |
|---|---|
| *A01D 45/02* | (2006.01) |
| *A01D 43/08* | (2006.01) |
| *A01D 41/12* | (2006.01) |
| *A01D 41/14* | (2006.01) |

(52) U.S. Cl.
CPC ......... *A01D 45/021* (2013.01); *A01D 43/081* (2013.01); *A01D 43/082* (2013.01); *A01D 43/086* (2013.01); *A01D 41/12* (2013.01); *A01D 41/141* (2013.01); *A01D 45/025* (2013.01)

(58) Field of Classification Search
CPC ... A01D 41/1243; A01F 12/40; A01F 12/444; A01F 29/12; A01F 12/30
USPC .......................................... 460/113, 112, 111
See application file for complete search history.

(56) References Cited

U.S. PATENT DOCUMENTS

| | | |
|---|---|---|
| 1,744,335 A | 1/1930 | Schlayer |
| 1,979,470 A | 11/1934 | Johnston |
| 2,380,347 A | 7/1945 | Vogel |
| 2,484,802 A | 10/1949 | Aasland |
| 2,527,786 A | 10/1950 | Barkstrom |
| 2,634,569 A | 4/1953 | Raney et al. |
| 2,725,702 A | 12/1955 | Ross |
| 2,877,616 A | 3/1959 | Gewalt et al. |
| 2,952,109 A | 9/1960 | Lambert |
| 3,208,206 A | 9/1965 | Lundell |
| 3,583,134 A | 6/1971 | Kemper et al. |
| 3,599,404 A | 8/1971 | Fernandez et al. |
| 3,680,291 A | 8/1972 | Soteropulos |
| 3,762,137 A | 10/1973 | Veretto |
| 3,984,966 A | 10/1976 | Outtier |
| 4,083,167 A | 4/1978 | Lindblom et al. |
| 4,148,175 A | 4/1979 | Miller |
| 4,182,098 A | 1/1980 | Kass |

(Continued)

FOREIGN PATENT DOCUMENTS

| | | |
|---|---|---|
| DE | 3133287 A1 * 3/1983 | ............ A01D 45/02 |
| DE | 19815571 A1 10/1999 | |

(Continued)

OTHER PUBLICATIONS

International Searching Authority, "Notification of Transmittal of The International Search Report and The Written Opinion of the International Searching Authority", for PCT/US2017/025884, dated Jun. 16, 2017, 8 pages.

*Primary Examiner* — Arpad Fabian-Kovacs

(74) *Attorney, Agent, or Firm* — Zarley Law Firm, P.L.C.

(57) ABSTRACT

A chopper assembly having a discharge conduit. A first and a second beater disposed within the discharge conduit and a first door and a second door in the bottom wall of the discharge conduit positioned below the first beater and the second beater respectively.

12 Claims, 2 Drawing Sheets

(56) References Cited

U.S. PATENT DOCUMENTS

| | | | |
|---|---|---|---|
| 4,251,980 A | 2/1981 | Miller | |
| 4,263,772 A * | 4/1981 | Phillips | A01F 29/12 56/13.3 |
| 4,373,536 A | 2/1983 | Da Silva | |
| 4,409,780 A | 10/1983 | Beougher et al. | |
| 4,510,948 A | 4/1985 | Dekeyzer | |
| 4,581,878 A | 4/1986 | Vida et al. | |
| 4,594,842 A | 6/1986 | Wolters et al. | |
| 4,622,804 A | 11/1986 | Krone et al. | |
| 4,637,406 A | 1/1987 | Guinn et al. | |
| 4,691,505 A | 9/1987 | Browne | |
| 4,696,432 A * | 9/1987 | Russ | A01D 43/086 241/101.742 |
| 4,702,423 A * | 10/1987 | Cerveira de Mello Ribeiro Pinto | A01D 45/10 241/101.742 |
| 4,875,330 A | 10/1989 | Deutsch et al. | |
| 4,926,623 A | 5/1990 | Fiener | |
| 5,052,170 A | 10/1991 | Trenkamp et al. | |
| 5,142,851 A | 9/1992 | Lydy et al. | |
| 5,330,114 A | 7/1994 | Trenkamp et al. | |
| 5,673,543 A | 10/1997 | Richardson et al. | |
| 5,733,192 A * | 3/1998 | Jones | A01F 12/22 460/106 |
| 5,875,622 A | 3/1999 | Stoll | |
| 5,911,625 A | 6/1999 | Von Allworden | |
| 6,073,429 A | 6/2000 | Wuebbels et al. | |
| 6,412,259 B1 | 7/2002 | Wiegert | |
| 6,415,590 B1 | 7/2002 | Lohrentz | |
| 6,416,405 B1 * | 7/2002 | Niermann | A01D 41/1243 241/186.3 |
| 6,554,701 B1 * | 4/2003 | Wolters | A01F 12/444 460/101 |
| 6,775,969 B2 | 8/2004 | Wuebbels et al. | |
| 7,043,889 B2 | 5/2006 | Rauch | |
| 7,047,717 B1 | 5/2006 | Wolters et al. | |
| 7,051,505 B2 | 5/2006 | Brannstrom | |
| 7,063,614 B2 | 6/2006 | Vogelgesang et al. | |
| 7,162,855 B2 | 1/2007 | Boeckmann et al. | |
| 7,297,053 B2 | 11/2007 | Farley | |
| 7,301,929 B2 | 11/2007 | Frederiksen et al. | |
| 7,360,351 B2 | 4/2008 | Rickert et al. | |
| 7,553,225 B2 | 6/2009 | Benes | |
| 7,640,741 B2 | 1/2010 | Hara | |
| 7,798,894 B2 | 9/2010 | Isfort | |
| 7,823,372 B1 | 11/2010 | Kraus | |
| 7,856,800 B2 | 12/2010 | Straeter | |
| 7,896,732 B2 * | 3/2011 | Benes | A01D 41/1243 460/112 |
| 7,927,200 B2 * | 4/2011 | Van Overschelde | A01F 12/40 460/112 |
| 7,993,188 B2 * | 8/2011 | Ritter | A01F 12/40 460/111 |
| 8,087,223 B2 | 1/2012 | Straeter | |
| 8,091,331 B2 | 1/2012 | Dow et al. | |
| 8,141,332 B2 | 3/2012 | Straeter | |
| 8,196,379 B2 | 6/2012 | Straeter | |
| 8,402,727 B2 | 3/2013 | Carboni | |
| 8,616,945 B2 * | 12/2013 | Ritter | A01D 41/1243 460/111 |
| 2003/0017861 A1 * | 1/2003 | Niermann | A01D 41/1243 460/112 |
| 2003/0100353 A1 * | 5/2003 | Wolters | A01D 41/1243 460/97 |
| 2004/0259611 A1 * | 12/2004 | Dow | A01F 12/40 460/112 |
| 2009/0113867 A1 * | 5/2009 | Birrell | A01F 12/444 56/13.3 |
| 2010/0048269 A1 * | 2/2010 | Ricketts | A01F 12/40 460/2 |
| 2010/0291982 A1 * | 11/2010 | Isaac | A01F 12/40 460/112 |
| 2011/0093169 A1 * | 4/2011 | Schroeder | A01D 41/1243 701/50 |
| 2012/0270613 A1 * | 10/2012 | Isaac | A01F 12/40 460/111 |
| 2013/0095899 A1 * | 4/2013 | Knapp | A01D 41/1243 460/111 |
| 2013/0263565 A1 * | 10/2013 | Yde | A01D 41/1243 56/122 |
| 2014/0053523 A1 | 2/2014 | Straeter | |
| 2014/0364179 A1 * | 12/2014 | Brinkmann | A01D 41/1243 460/112 |
| 2016/0081272 A1 | 3/2016 | Vande Ryse et al. | |
| 2016/0135370 A1 * | 5/2016 | Farley | A01F 12/446 460/119 |
| 2016/0150727 A1 * | 6/2016 | Mayerle | A01F 12/10 460/112 |
| 2017/0034997 A1 * | 2/2017 | Mayerle | A01F 12/40 |
| 2017/0079207 A1 * | 3/2017 | Puryk | A01D 41/1243 |

FOREIGN PATENT DOCUMENTS

| | | | |
|---|---|---|---|
| EP | 0538720 A1 * | 4/1993 | B21D 53/64 |
| EP | 0631717 A1 * | 1/1995 | A01D 41/1243 |
| EP | 1897430 A1 * | 3/2008 | A01D 41/1243 |
| EP | 2384610 A2 * | 11/2011 | A01D 41/1243 |
| FR | 2480556 A1 | 10/1981 | |

* cited by examiner

CHOPPER ASSEMBLY

CROSS REFERENCE TO RELATED APPLICATION

This application claims the benefit of U.S. Provisional Application No. 62/317,714 filed Apr. 4, 2016.

BACKGROUND OF THE INVENTION

This invention is directed to a chopping assembly, and more particularly to a chopping assembly that provides mechanical control of moving chopped product throughout the system.

Chopping assemblies are known in the art for processing corn stalks and other crops for a desired use. Typically, a stover chopping assembly is mounted to a harvesting corn header and includes a blade assembly disposed within a housing in communication with a discharge channel or conduit that leads to a conveyor. While useful, chopped crop product occasionally plugs in the discharge conduit especially in difficult, wet conditions or material is lost from the chopper when moved through an open space between the chopper and conveyor such as with the product design used by Geringhoff. When a plug occurs the operation of the header and combine is halted and often the operator must manually remove a plug, leading to lost time and considerable interruption of the harvesting operation. The plug removal usually requires the operator to leave the cab of the combine, thus creating more delay and effort. Providing a system that limits or eliminates lost material while providing plug-free operation or easy unplugging therefore is needed.

Thus, an object of the present invention is to provide a chopping assembly where a harvester need not be slowed or stopped to remove a plug in a discharge conduit.

Another objective of the present invention is to provide a chopping assembly where plugs are removed automatically, without manual assistance, in a process of header reversal that is used to unplug areas of the header not associated with the chopper.

Another objective of the present invention is to provide a means of transport that has no part of the transport path of the chopped material where it is moved solely by momentum or air and movement is always being controlled by a mechanical means.

Another objective of the present invention is to provide a mechanical transport means that has open paths for material coming off of the chopping knives to go directly to the conveyor without solely mechanical movement.

SUMMARY OF THE INVENTION

A chopper assembly having a blade assembly disposed within a housing having a discharge port. Mounted to the housing and in communication with the discharge port is a discharge conduit.

Rotatably mounted within the discharge conduit is one or more beaters. The beaters preferably have a plurality of paddles mounted to a rotatable shaft. Positioned below the first beater in a bottom wall of the discharge conduit is a first door. The first door pivots downwardly from a closed to an open position. Positioned below the second beater in the bottom wall of the discharge conduit is a second door. The second door pivots upwardly between the first and the second beater from a closed to an open position.

DETAILED DESCRIPTION OF THE PREFERRED EMBODIMENT

Figure 1:
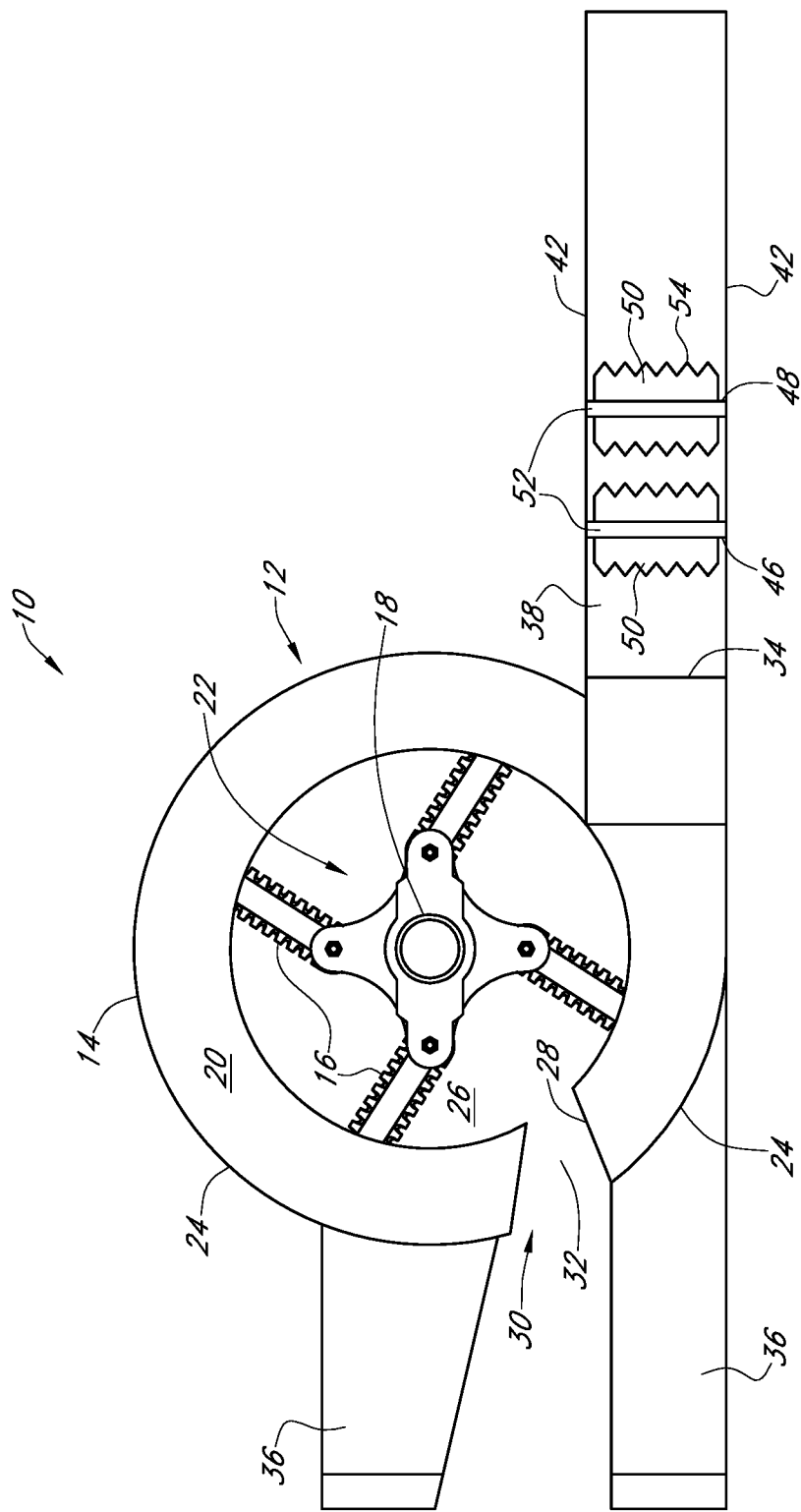
FIG. 1 is a top plan view of a chopper assembly.
Figure 2:
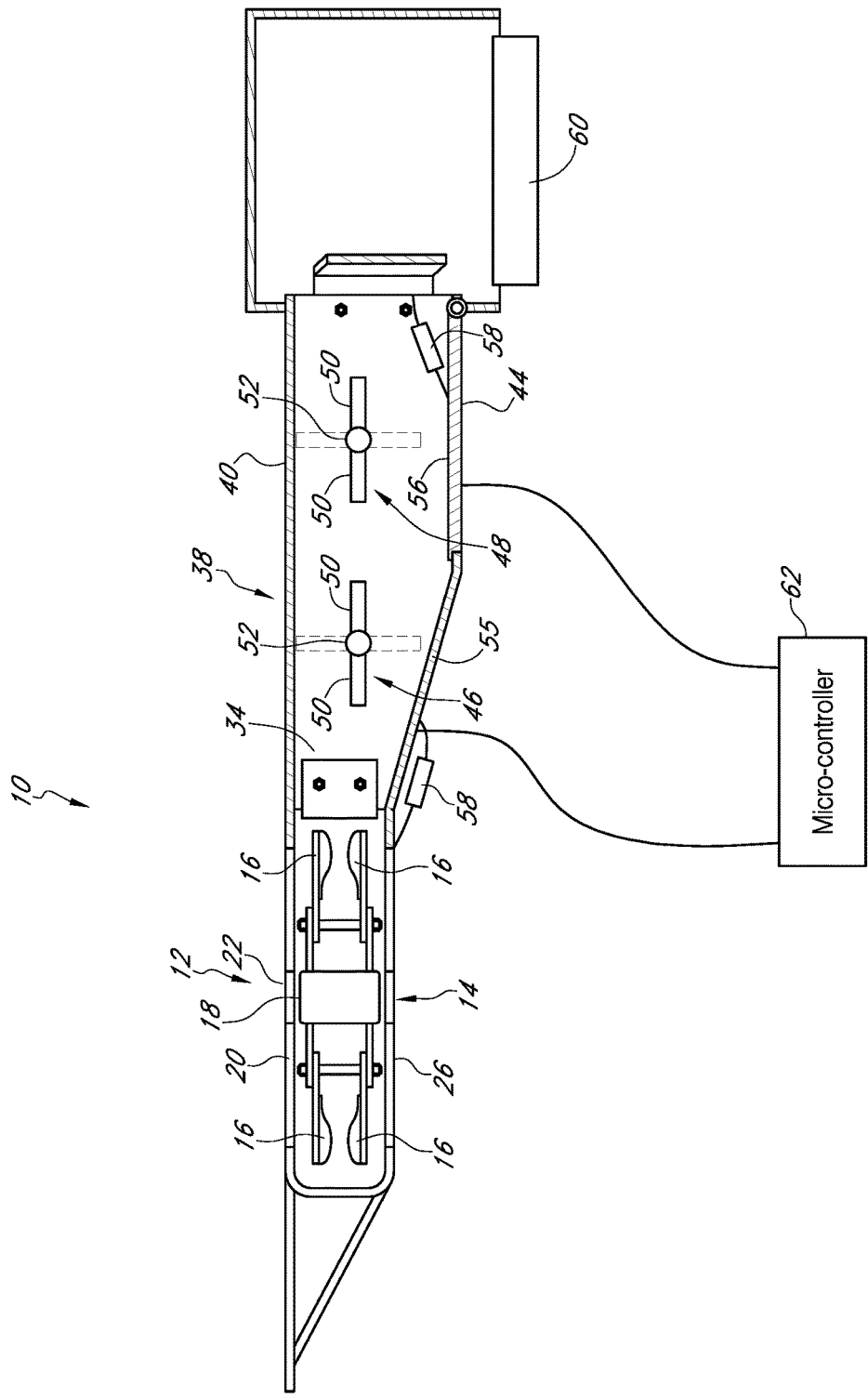
FIG. 2 is a side sectional view of a chopper assembly.

Referring to the figures, a chopping assembly 10 has a blade assembly 12 disposed within a housing 14. The blade assembly is of any type and as shown by example only, have the structure of the blade assemblies disclosed in U.S. Pat. Nos. 7,856,800, 8,087,223, and 8,141,332, herein incorporated by reference in their entireties. Generally, the blade assembly 12 includes a plurality of blades 16 that are attached to and extend radially and outwardly from a drive shaft 18.

The housing 14 has a top wall 20 connected to a harvesting implement (not shown) with an opening 22 through which drive shaft 18 extends. The housing also has an arcuate side wall 24 and a bottom wall 26 having an opening 28 and a slot 30. The side wall 24 has an inlet port 32 and a discharge port 34. Extending outwardly from the inlet port 32 of housing 14 are guide members 36.

Mounted to an in communication with the discharge port 34 is an elongated discharge conduit 38. The discharge conduit 38 has a top wall 40, side walls 42, and a bottom wall 44. Rotatably mounted to and extending between side walls 42 is a first beater 46 and a second beater 48. The beaters 46 and 48 are of any type and, in one example, have a plurality of paddles 50 mounted to a shaft 52 that extends through side walls 42. In a preferred embodiment, the beaters 46 and 48 have two paddles 50 with a plurality of teeth 54 on an outer edge. The paddles 50 preferably dwell in the same plane on opposite sides of shaft 52. The beaters 46 and 48, in one example, spaced to avoid contact with each other but separated with minimal distance. Also, beater 46 is positioned adjacent to blades 16 to minimize any gap between the two to eliminate a non-active area where stover could plug. Further, the beaters 46 and 48 preferably are timed so that all paddles dwell in a horizontal plane at a 3 o'clock and 9 o'clock position and are in a parallel vertical spaced relation at a 12 o'clock and 6 o'clock position. The beaters 46 and 48 and the blade assemblies 12 are mechanically driven and controlled by the operation of a corn header (not shown).

The bottom wall 44 of discharge conduit 38 has a first door 55 and a second door 56 positioned below the first beater 46 and second beater 48, respectively. Both doors 55 and 56 have actuators 58 that move the doors from a closed position to an open position or are controlled by a single actuator and are mechanically connected. The first door 55 pivots downwardly in relation to the discharge conduit 38 to move from a closed to an open position. The second door 56 pivots upwardly into the discharge conduit 38 and between the first beater 46 and the second beater 48 when the door 56 moves from a closed to an open position. At an end opposite of the blade assembly 12, the discharge conduit 38 is connected to and in communication with a discharge conveyor 60.

The door actuators 58 are connected to a micro-controller 62. The micro-controller 62 controls the activation of actuators 58.

In operation, as the harvesting implement moves forward, a stalk or stem of a harvested plant is directed by guide members 36 to the inlet port 32 of housing 14. As the stalk or stem enters the inlet port 32, it is captured in slot 30 where the blades 16, rotated by drive shaft 18, cuts the plant from its roots and further cuts the stalk into chopped stover. The rotation of the blades 16, with the assistance of the housing 14, moves the chopped stover through the discharge port 34 and into the discharge conduit 38. The first beater 46 and second beater 48 transport stover through the discharge conduit 38 to the discharge conveyor 60 mechanically. The discharge conveyor 60 transports the stover to a windrow position. In this manner, stover is positively and mechanically transported from the blades to the beaters and to the discharge conveyor instead of relying upon momentum and/or air flow.

If the discharge conduit 38 becomes plugged, an operator utilizing existing driveline capabilities of the corn header, reverses the corn header which reverses the rotational direction of beaters 46 and 48, material is driven back toward the blades and either falls on the ground or is discharged through the inlet of the blade assembly.

Also, if the discharge conduit 38 becomes plugged with stover, or if one does not wish to take all the stover to windrow using the micro-controller 62, an operator activates actuators 58 which moves doors 55 and 56 from a closed to an open position. When in an open position, the front door 55 goes down providing greater area under the first beater 46 and permits stover to be transported to the ground. The second door 56 moves upwardly into the discharge conduit 38 between the first beater 46 and the second beater 48 and provides a dam directing stover out of conduit 38. This process allows a plug to be discharged through the first door 55 opening without disrupting the harvesting process by providing a positive discharge where the beater 46 drives material through the first door 55.

To take advantage of the considerable velocity of material coming off the chopper knives, the beaters 46 and 48 can be timed such that at one part of their rotation both beaters have blades 50 that are horizontal, thereby opening a path above shaft 52 and below shaft 52 where material can move directly to conveyor 60 unimpeded. As beaters 46 and 48 continue their rotation, any material in tunnel 38 that didn't move all the way to conveyor 60 is positively moved toward the conveyor 60. In this manner material is quickly and positively moved from the chopper to the conveyor with no chance of plugging.

Therefore, a chopper assembly has been disclosed that at the very least meets all the stated objectives.

What is claimed is:

1. A chopper assembly, comprising;
   a blade assembly disposed within a housing having a discharge port;
   a discharge conduit mounted to the housing and in communication with the discharge port; and
   a first beater and a second beater rotatably mounted within the discharge conduit;
   wherein the discharge conduit has a second door in a bottom wall that pivots upwardly between the first beater and the second beater.

2. The assembly of claim 1 wherein the first beater and the second beater each having a plurality of paddles mounted to a shaft.

3. The assembly of claim 1 wherein the first beater and the second beater each have two paddles mounted to a shaft that dwell in the same plane on opposite sides of the shaft.

4. The assembly of claim 1 wherein the first beater and the second beater each have a plurality of paddles mounted to a shaft and the plurality of paddles have teeth on an outer edge.

5. The assembly of claim 1 wherein the first beater and the second beater have a rotational diameter where the first beater and the second beater cannot contact each other but have a minimal distance between them.

6. The assembly of claim 1 wherein the first beater and the second beater each have a plurality of paddles mounted to a shaft that are timed to dwell in a horizontal plane at a 3 o'clock and a 9 o'clock position and in a parallel vertical spaced relation at a 12 o'clock and 6 o'clock position.

7. The assembly of claim 1 wherein the bottom wall has a first door positioned below the first beater and the second door positioned below a second beater.

8. The assembly of claim 1 wherein the discharge conduit has a first door in the bottom wall that pivots downwardly from a closed position to an open position.

9. A chopper assembly, comprising;
   a blade assembly disposed within a housing having a discharge port;
   a discharge conduit having a top wall, a bottom wall, and sidewalls, mounted to the housing and in communication with the discharge port;
   a first beater and a second beater rotatably mounted within the discharge conduit; and
   the bottom wall having a first door positioned below the first beater and a second door positioned below the second beater.

10. The assembly of claim 9 wherein the first door is configured to pivot downwardly from a closed position to an open position and the second door is configured to pivot upwardly between the first beater and the second beater.

11. The assembly of claim 9 wherein the first beater and the second beater each having a shaft with only two paddles mounted on opposing sides of the shaft of each beater, such that the two paddles extend in parallel alignment with each other.

12. The assembly of claim 11 wherein the paddles of each beater are configured to rotate in sync, such that the paddles of each beater extend within a horizontal plane at a 3 o'clock and a 9 o'clock position at the same time, and in a parallel vertical spaced relation at a 12 o'clock and 6 o'clock position at the same time thereby forming a path below and above each shaft when the paddles of each beater extend within the horizontal plane at a 3 o'clock and a 9 o'clock position at the same time.

* * * * *